United States Patent [19]

Delons et al.

[11] Patent Number: 4,681,680

[45] Date of Patent: Jul. 21, 1987

[54] DEVICE FOR THE SELECTIVE AND CONTINUOUS RECOVERY OF HYDROCARBONS PRESENT IN THE FORM OF A SHEET AT THE SURFACE OF AN AQUEOUS MEDIUM

[75] Inventors: Luc Delons, Pau; Roger Chaumont, Condrieu, both of France

[73] Assignee: Elf France, Paris, France

[21] Appl. No.: 503,048

[22] Filed: Jun. 10, 1983

[30] Foreign Application Priority Data

Jun. 11, 1982 [FR] France .................. 82 10231

[51] Int. Cl.$^4$ .......................................... B01D 17/12
[52] U.S. Cl. ................... 210/110; 210/242.3; 210/242.4; 210/924
[58] Field of Search ............ 210/104, 110, 145, 147, 210/148, 242.3, 242.4, 766, 784, 799, 923, 924, 359, 396, 402

[56] References Cited

U.S. PATENT DOCUMENTS

| | | | |
|---|---|---|---|
| 3,536,199 | 10/1970 | Cornelius | 210/242.3 |
| 3,693,805 | 9/1972 | Tillett et al. | 210/519 |
| 3,744,257 | 7/1973 | Spanner | 61/46.5 |
| 3,804,251 | 4/1974 | Farrell et al. | 210/242.3 |
| 3,884,807 | 5/1975 | Heddon | 210/242.2 |
| 3,951,810 | 4/1976 | Crisafulli | 210/242.3 |
| 3,968,041 | 7/1976 | DeVoss | 210/242.3 |
| 3,992,292 | 11/1976 | Grimes et al. | 210/242.3 |
| 4,115,271 | 9/1978 | Holt | 210/247 |

FOREIGN PATENT DOCUMENTS

| | | |
|---|---|---|
| 959423 | 12/1974 | Canada . |
| 87548 | 7/1983 | European Pat. Off. . |
| 1459419 | 1/1969 | Fed. Rep. of Germany ...... 210/923 |
| 2376082 | 7/1978 | France . |
| 2390553 | 12/1978 | France . |

*Primary Examiner*—Richard V. Fisher
*Assistant Examiner*—Wanda L. Millard
*Attorney, Agent, or Firm*—Weiser & Stapler

[57] ABSTRACT

Device allowing the selective and continuous recovery of hydrocarbons present in the form of a sheet or nappe at the surface of an aqueous medium. It is essentially constituted by a roller covered with a hydrophobic and oleophilic material 5 partially surrounded by a mobile recipient 6 provided with evacuation means of the aqueous medium 52. This device is particularly well adapted to the deoiling of a decanting basin.

14 Claims, 8 Drawing Figures

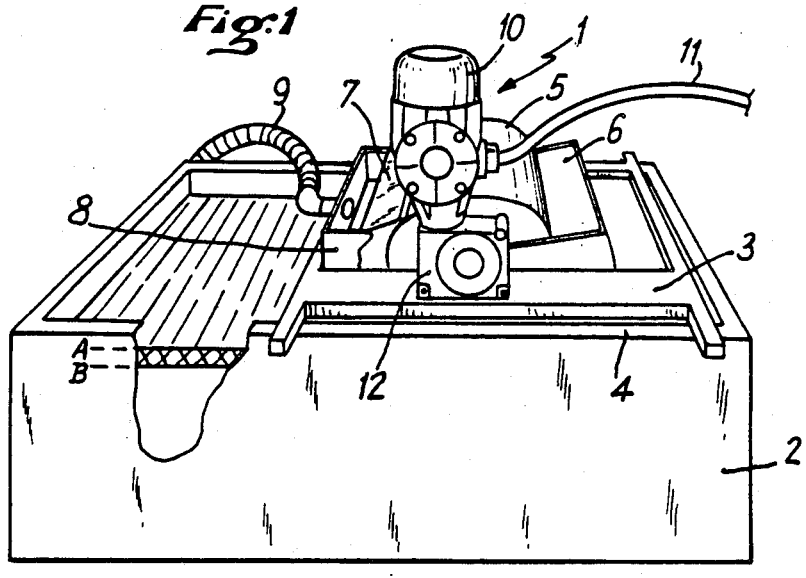
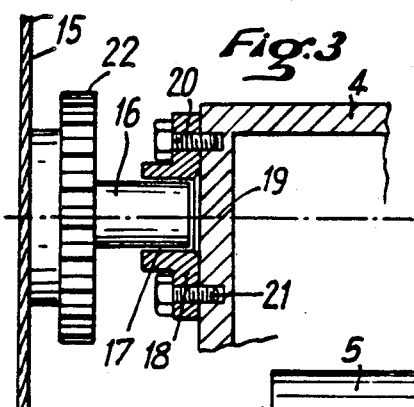
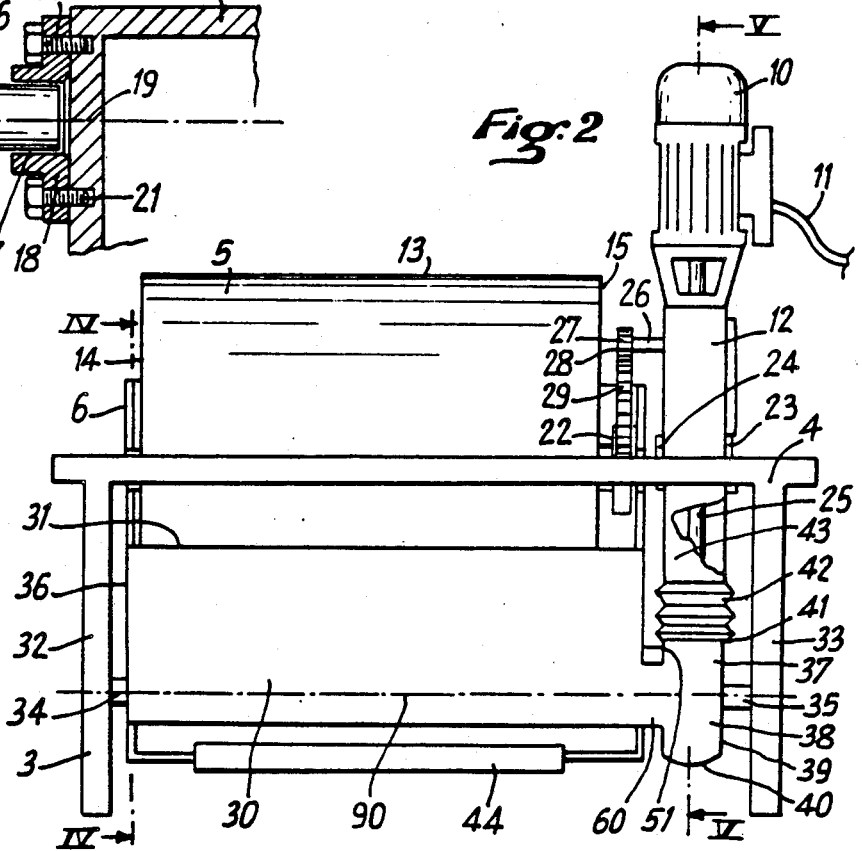

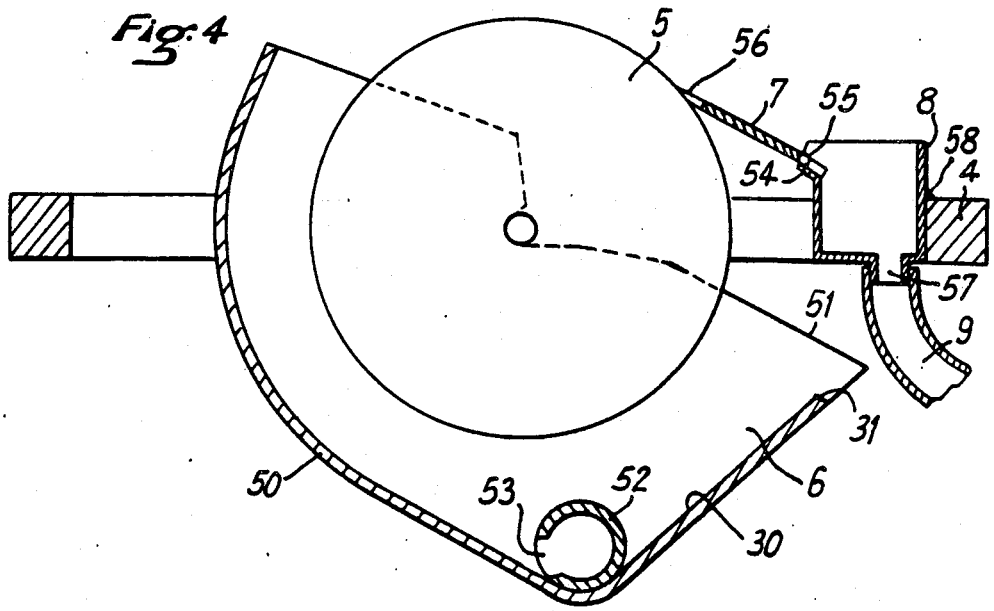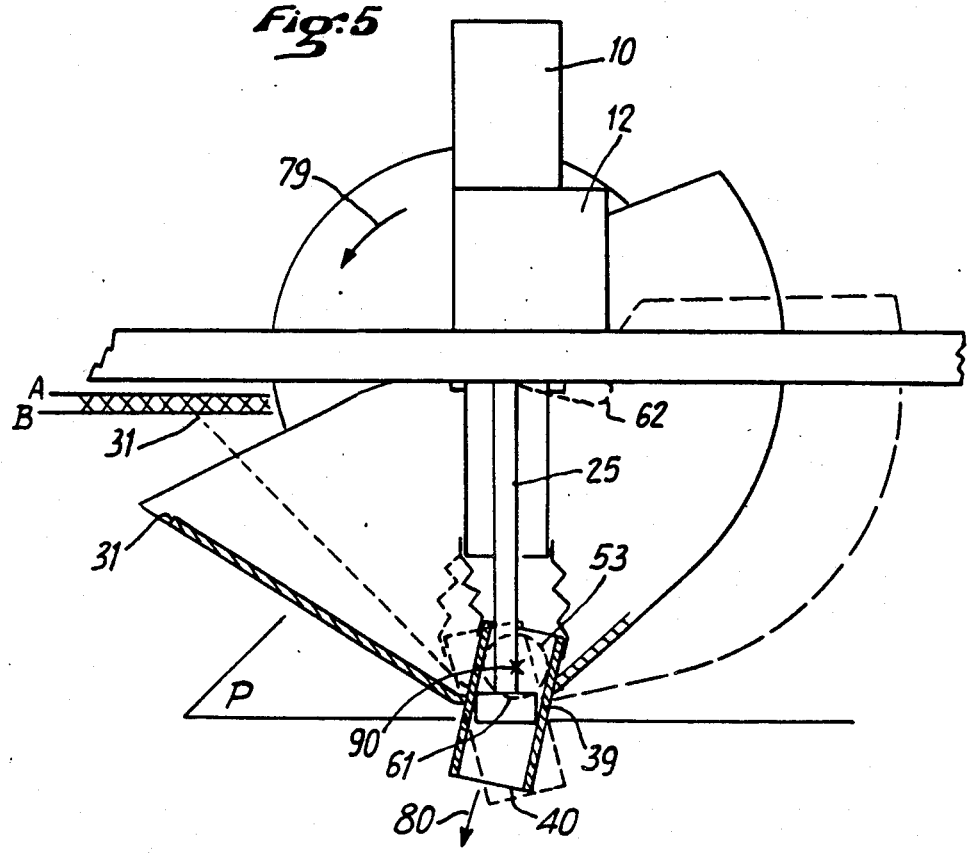

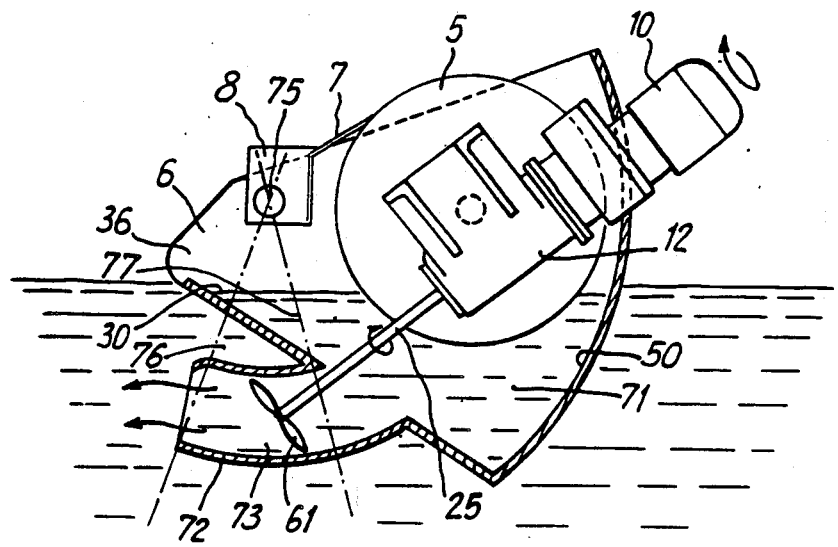
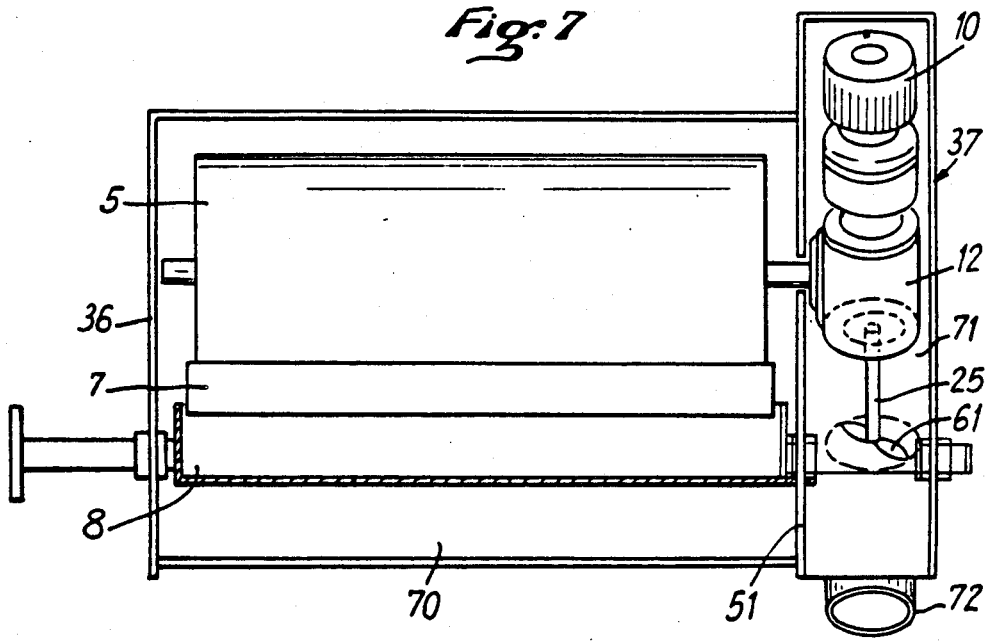

DEVICE FOR THE SELECTIVE AND CONTINUOUS RECOVERY OF HYDROCARBONS PRESENT IN THE FORM OF A SHEET AT THE SURFACE OF AN AQUEOUS MEDIUM

The present invention relates to a device allowing the selective and continuous recovery of hydrocarbons present in the form of a sheet or nappe at the surface of an aqueous medium.

The recovery of hydrocarbons at the surface of the water tables, particularly in natural or artificial settling pits, necessitates the use of recuperator devices that can be classed in two wide categories. The first concerns superficial oil separators that are apparatus which collect a certain layer of liquid at the surface, without making a distinction between the hydrocarbons and water. They create a superficial current that allows to attract the deposit at distance but present the drawback of supplying a mixture of water and hydrocarbons. It is thus necessary, in order to obtain a complete separation, to dispose downstream of these devices a separation system fed by a pump, the use of which presents the risk of creating an emulsion of the mixture that necessitates either another decantation or settling stage, or the use of over-dimensioned devices allowing to separate the hydrocarbons present in the form of emulsion in water. Such devices are, for example, known to the man skilled in the art under the name of "mobile spouts" and are described in Chapter 6, volume : "Liquid Wastes" of the Manual on disposal of refinery wastes, edited by THE AMERICAN PETROLEUM INSTITUTE Copyright 1969.

The second category of recuperators concerns selective recuperators, i.e. devices that operate the properties of certain materials that are both hydrophobic and oleophilic. Such materials are, for example, described in French patent application published under No. 2.390.553 "Scrubbing device for the recovery of an organic compound in an aqueous medium" and their use is described in the manual cited herein-above that foresees a hydrophobicoleophilic rotative drum associated to a scraping blade allowing the recovery of the hydrocarbons. Furthermore, other realisations are known in the form of disks, endless belts, . . . . These recuperators are thus more or less selective but their use presents several restrictions that hamper continuous optimal exploitation.

In particular, it is necessary that the hydrocarbon sheets be situated immediately adjacent to the roller since said roller does not create any superficial attraction current. Furthermore, it is necessary that the sheet be in contact during sufficiently long time since the oil is deposited at the surface of the drum in the form of a thick film, generally much thinner that that of the sheet that floats on the surface of the aqueous medium. Thus, the use of a drum to recover the hydrocarbons of a sheet in motion can only be made with complicated equipment, for example, comprising several drums or a large-size drum and does not supply a good yield. Such equipment is difficult to place in existing installations, particularly decanting basins or settling pits of refineries, unless they are associated to mechanical scraping equipment.

On the other hand, the present invention foresees a device that allows selective and continuous recovery of a hydrocarbon sheet present at the surface of an aqueous medium, this device being simple and hardly cumbersome and allowing, furthermore, to attract the sheet towards it.

This device comprises extraction means constituted by at least one continuous wall, put into motion responsive to driving means, above the plane of rotation of a propeller means and about a horizontal axis, the said wall being constituted, at least superficially, by an oleophilic and hydrophobic material, and being disposed in such a way that its lower part can be in contact with the hydrocarbons to be recovered; thus that the upper part is in contact with the recuperator means allowing the recovery of the hydrocarbons having adhered to the extraction means.

According to the invention, this device comprises attraction means of the hydrocarbon sheet, allowing to attract this sheet immediately adjacent to the lower part of the continuous wall and to create an accumulation zone of hydrocarbons in which these are maintained at a substantially constant level.

This device allows not only to recover the hydrocarbons with a good yield, since these are accumulated at the level of the hydrophobic-oleophilic material, but furthermore to draw the sheet towards this accumulation zone while foreseeing any remixture of the hydrocarbons with water.

Is meant by hydrophobic and oleophilic material, any material liable to be wetted, in the presence of water, by the hydrocarbons present in the sheet, whereas the absence of the polar character prevents it from being wetted by water. Such materials are well known by the man skilled in the art, and can consist, for example, of stainless steel, black steel, aluminum or a plastic material.

Preferably, the attraction means of the sheet is constituted by a recipient that comprises a first face, parallel to the generatrix of a roller constituting the extraction means, and the upper edge of which is free, and a second face, connected to the lower edge of said first face. These two faces are connected to the lateral flanges, parallel in such a way that the assembly defines a volume, open in its upper part and surrounding at least the lower part of the roller; the recipient comprises, furthermore, a collecting and evacuation means of the aqueous medium.

According to another characteristic, the recipient is mobile in rotation about a horizontal axis between a high position and a low position in which the upper edge of the plane surface is immersed at a depth such that the liquid flow-rate entering the recipient is equal to the sum of the extraction outputs of the hydrocarbons by the roller and evacuation of the water by evacuation means.

Preferably, the recipient presents a lateral section asymmetric with respect to the plane passing through the axis of rotation, so that the parts of the recipient situated on either side of this plane have different volumes, the forward volume being the smaller.

Other characteristics and advantages of the invention will appear from reading the following description, given by way of non-limitative illustration with reference to the annexed drawings in which:

FIG. 1 is a view in perspective of a device realized according to the invention;

FIG. 2 is a front view of the device represented in FIG. 1;

FIG. 3 is a detailed section of FIG. 2;

FIG. 4 is a view along a section IV—IV of FIG. 2;

FIG. 5 is a view along a section V—V of FIG. 2;

FIG. 6 is a partial view, as a section, of a second embodiment of the invention;

FIG. 7 is a view from above of the device represented in FIG. 6;

Figure 8:
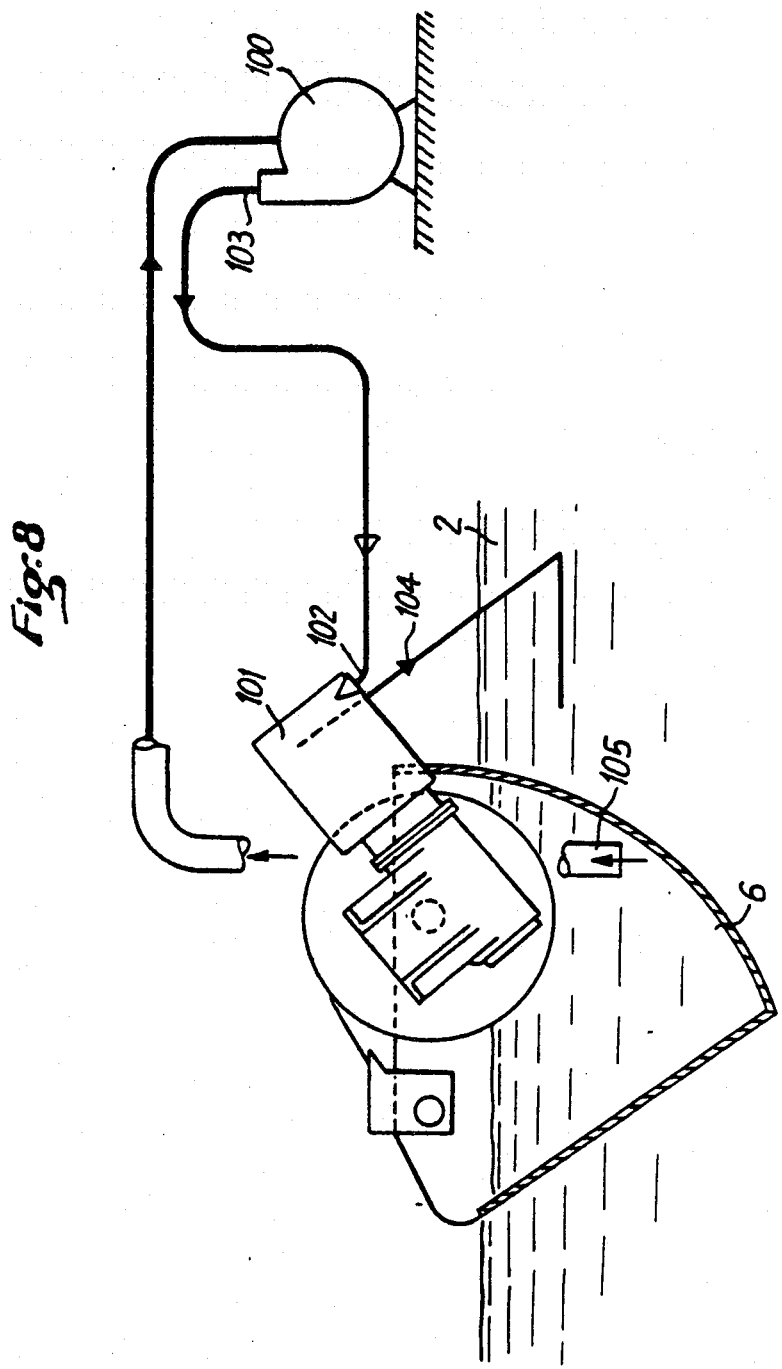

FIG. 8 schematically represents a third embodiment of the realisation according to the invention.

FIG. 1 represents a device 1 according to the invention placed at an extremity of a basin 2.

Device 1 comprises a housing 3 placed on the edges 4 of the basin 2, a roller 5, a mobile recipient 6, a scraping blade 7, the fixed extremity of which issues into a recovery spout 8 to which is connected a flexible pipeline 9, the free extremity of which issues into a hydrocarbon storage basin (not shown). The device comprises, furthermore, an electric motor 10 fed by cable 11 and a motor reducer 12, fixed on the housing 3.

FIG. 2 represents the device seen from the front. For clarity's sake, the scraping device comprising the scraping blade 7 and the spout 8 has not been represented.

Roller 5 comprises a cylindrical wall 13 and two lateral faces 14 and 15. Wall 15 is provided with a journal 16 (FIG. 3) engaged in a bore 17 provided in a support 18 screwed to the wall 19 of the housing 3 by screws 20 and 21. Wall 15 also comprises a gear-wheel 22, concentric to the journal 16. Wall 14 is mounted in the same manner but does not comprise a gear-wheel. Motor reducer 12 is maintained in place on the housing 3 through the intermediary of the two lugs 23 and 24 to which it is screwed. At its upper part is fixed the electric motor 10 that is an asynchron three-phase motor of 0.75Kw. Motor reducer 12 has a worm and wheel drive, the worm of which is situated on the axis of the motor shaft and turns at the same speed as said shaft. It is extended by shaft 25. The wheel meshes on the screw and controls the shaft 26, the extremity 27 of which comprises a pinion 28 connected to the gear-wheel 22 by an endless chain 29. The mobile recipient is constituted by a frontal wall 30, a rear wall 50 and two lateral flanges 51 and 36. The upper edge of the frontal wall 30 is situated at a level lower than that of the housing 4. It is connected to uprights 32 and 33 of the housing by two axles 34 and 35. Axle 34 is borne by lateral wall 36 of the recipient 6 whereas axle 35 is borne by wall 37 of the evacuation spout 38 which is shown as a torus that is constituted by a tube 39 open at its lower part 40 and the upper extremity 41 of which is connected by a bellow 42 to a casing 43 surrounding shaft 25 and fixed to housing 4. Tube 39 is connected to the wall 51 by a cylindrical casing 60. Recipient 6 comprises a system of counter-weights 44.

FIG. 4, which is a view of a section of the device, represents on the one hand, roller 5, the mobile recipient 6 constituted by frontal wall 30 that is plane and extended by rear wall 50. The two walls are welded to the lateral wall 51. Upper edge 31 is at a level lower than that of the upper edge of the lateral wall 51. The evacuation means is constituted by a tube 52, welded to the lower part of the recipient and provided with a longitudinal opening 53, issuing into cylindrical casing 60. Scraping blade 7 is fixed on edge 54 of the spout 8 through the intermediary of a hinge 55 and it is extended by a bevelled blade 56 made of hydrocarbon-resistent polymer material.

The spout is pierced by a bore 57 issuing into a flexible pipe 9. It is connected to housing 4 by a welding seam 58.

FIG. 5, which is a section along axis VV of FIG. 2, represents the mobile recipient in its two extreme positions. Tube 39 presents a section so that the propeller 61, represented schematically by a rectangle, can turn, whatever the orientation of the tube, which is rendered possible by the fact that plane P in which turns the propeller contains the axis of rotation of the recipient 6. The section of the recipient 6, such as defined by front wall 30 and rear wall 50 is asymmetric with respect to the vertical plane passing through the axis of rotation 90 of the recipient 6 and thus it will be noted that on this FIG. 5, the part of the recipient situated on the side of the edge 31 of the front wall 30 has a volume clearly smaller than that of the part situated on the other side of the plane.

The lower part of each of flanges 51 and 36 presents a cut-out part 62 allowing the passage of the journals 16, 17 when the recipient 6 is in low position.

FIGS. 6 and 7 represent schematically a variant of realizing the device according to the invention. On these figures, the parts identical to those of FIGS. 1 to 5 are indicated by the same references.

Recipient 6 comprises flanges 51, 36 and 37, a front wall, a rear wall 50 that define two enclosures.

Enclosure 70 surrounds roller 5 whereas enclosure 71 constitutes a casing for the assembly constituted by motor 10, the motor-reducer 12, shaft 25 and propeller 61. Flange 51 separating the two enclosures comprises at its lower part an opening for communicating one enclosure to the other. Enclosure 71 comprises a conduit 72 having a diameter slightly larger than that of the propeller. This conduit comprises a zone 73 having the form of a section of a torus the axis of symmetry of which coincides with the axis of articulation 75 of the recipient 6. This axis 75 is situated at the level of the recovery spout 8. Zone 73 is comprised between the two crossing axii 76 and 77.

The operating of the device represented on FIG. 1 is explained as follows, with particular reference to FIGS. 1 and 5.

Tank 2 is filled with water on the surface of which floats a sheet of oil. The upper level of the sheet of oil is represented by reference A whereas B represents the lower level. When the device is idle, i.e. when motor 10 is not fed, the device occupies the position represented in the figure in broken Lines.

When motor 10 is actuated, the device turns in the direction represented by the arrow 79 and the propeller 61 evacuates the water in the direction of arrow 80. Roller 5 evacuates an oil flow-rate dh, the turbine a water flow-rate de. According to the tilting of the recipient and thus the immersion depth of the upper edge 31 of the frontal wall 30, is introduced into the recipient 6 an oil and water flow-rate di.

Due to the asymmetry of the parts of the recipient 6, that are on either side of the perpendicular plane passing through the axis of rotation 90, the recipient will assume a tilting according to which flow-rate di will be equal to the sum of dh+de.

Flow-rate de is selected substantially larger than flow-rate dh so that there is an accumulation of hydrocarbon inside the recipient.

It is therefore simple to understand that this device allows a selective recovery of the hydrocarbons through the use of the drum and that it allows, furthermore, to attract the hydrocarbons adjacent to this drum without creating a turbulence zone or displacement of the sheet, which authorizes a long contact time between the sheet and the drum.

Furthermore, this device does not create any remixture or emulsion of the hydrocarbons in the water.

It is evident that through the action of the counterweights 44, on the respective speeds of the drum 5 and the propeller 61 it is possible to vary the tilting of the recipient in function of the characteristics of the hydrocarbons to be recovered and the thickness of the sheet. However, these different parameters will be adjusted so as to prevent the hydrocarbons contained inside the recipient from contacting with the propeller and from being propelled towards the outside, which could create emulsions and necessitate a decantation operation.

1. In a device for the selective and continuous recovery of hydrocarbons present in the form of a sheet on the surface of a liquid medium, an extraction means comprising:

a roller mounted for rotation within a housing and about a horizontal axis, and having a surface comprised of a hydrophobic and oleophilic material and disposed within said housing so that lower portions of the roller surface are capable of being brought into contact with the hydrocarbons to be recovered;

recuperator means operatively associated with upper to create a stream favoring the operation of said recipient.

9. Device according to claim 3, wherein the evacuation means further comprises an electric motor having an output shaft coupled to a motor reducer which is operatively connected to a shaft for the control of said propeller means, and a means for rotating the roller.

10. Device according to claim 2, wherein the evacuation means further comprises a pump located outside of said recipient, a suction conduit, and a strainer conduit, wherein said suction conduit issues from lower portions of said recipient and said strainer conduit constitutes the input of a hydraulic motor for operating said roller.

11. Device according to claim 10, wherein the strainer conduit of the hydraulic motor extends from said liquid medium.

12. Device according to claim 11, positioned at one extremity of a rectangular tank, wherein the evacuation means further comprises a deflector for directing evacuated liquid toward the other extremity of the tank so as to create a stream favoring the operation of said recipient.

13. Device according to claim 2, wherein the receipient, in cross-section, is asymmetric such that a plane passing through the axis of rotation of said recipient defines two parts on either side of said plane, wherein the volume of the part adjacent to the first face is smaller than the volume of the part associated with the second face.

14. Device according to claim 2, wherein the recipient further comprises a plurality of counterweights operatively associated therewith.

* * * * *